(12) United States Patent
Yasuzato (10) Patent No.: US 6,571,053 B1
(45) Date of Patent: May 27, 2003

(54) TELEVISION PROGRAM RECORDING SYSTEM

(75) Inventor: Masashi Yasuzato, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/357,846

(22) Filed: Jul. 21, 1999

(30) Foreign Application Priority Data

Jul. 23, 1998 (JP) .......................................... 10-208219

(51) Int. Cl.⁷ ................................................ H04N 5/91
(52) U.S. Cl. ...................................................... 386/83
(58) Field of Search ............................. 386/46, 83, 95, 386/96; 348/460, 906

(56) References Cited

U.S. PATENT DOCUMENTS

| 5,307,173 A | | 4/1994 | Yuen et al. ................. 358/335 |
| 5,508,815 A | * | 4/1996 | Levine ......................... 386/83 |
| 5,541,738 A | * | 7/1996 | Mankovitz .................... 386/83 |
| 5,684,878 A | | 11/1997 | Nagura | |

FOREIGN PATENT DOCUMENTS

| EP | WO 94/21081 | 9/1994 |
| JP | 61-142489 | 6/1986 |

* cited by examiner

*Primary Examiner*—Huy Nguyen
(74) *Attorney, Agent, or Firm*—Pillsbury Winthrop LLP (57) ABSTRACT

When recording a signal to a magnetic tape 12 serving as a recording medium, recording information 36 including the start time and the end time of recording and the recording source is stored to storage means 6 other than the above tape 12. Such recording information 36 is provided with a particular ID number 37 so that it can be read out later and such ID number information 37 is recorded on the above tape 12. Later, when the user sets the timer recording reservation for a program with the same start time and the same end time and on the same channel as those for the previous program on the tape 12 having the recorded program, the ID number information 37 is read out from the tape 12 and the storage information 36 specified by the ID number 37 is read out from the storage means 6 upon pressing of the set key 23. By storing the read out recording information 36 to the reservation memory 51 of the timer reservation setting means 5, the user can set the timer reservation. When the reserved time is reached, the system starts recording of the signal on the tape 12.

17 Claims, 4 Drawing Sheets

TELEVISION PROGRAM RECORDING SYSTEM

BACKGROUND OF THE INVENTION

1. Field of the Invention

The present invention relates to a TV program recording system such as a home VTR to reserve and record television broadcasting programs.

2. Description of the Related Art

In general, recording and reproducing apparatus such as video tape recorders (VTR) are provided with a timer reservation device. Using this device, the user can make recording reservation for automatic recording of television (TV) broadcasting programs by inputting a recording reservation information including the channel, the start time and the end time of a program to be recorded.

There are two ways of timer recording reservation. By operating the keys on the VTR itself or on the attached remote controller, the user may (1) input the above recording reservation information one by one or (2) input a several-digit value (identification code) encoding the recording reservation information above. For the former method (1), it is required to set the channel, the date, the start time and the end time of the broadcast program. For the latter method (2), the user just inputs the above identification code. Unlike the method (1), it is not required to set the channel, the date, the start time and the end time of the program. The user can make reservation by inputting the numbers of the identification code referring to the program table on newspapers or the like. The recording reservation setting method using such identification code is described in the U.S. Pat. No. 5,307,173 (Japan Published Patent Gazette No. Hei 4-502681). For any timer reservation, the user must make key operation several times.

Conventionally, when the next broadcasting of the recorded TV program is scheduled in the following week or on the following day, the user needs to make the timer recording reservation again to record such next time broadcasting by timer reservation. It is troublesome to repeat several key operations according to the conventional method (1) or (2).

Though VTRs are usually provided with periodic reservation function for every day or every week in the timer recording reservation method, it is inconvenient for the user to repeat the operation according to the method (1) or (2) just to set the recording reservation for the next time only.

Japan Published Unexamined Patent Application No. Sho 61-142489 discloses means to reduce the number of key operations when making a reservation. According to this invention, the reservation can be made with a reduced number of key operations and can be made simple. In this invention, time zones when the user frequently views TV programs are separately set and stored in advance and, for reservation of a program in such time zones, the stored time zone is transferred to the reservation memory for reservation setting operation.

In this case, however, it is necessary to set time zones when the user frequently views TV separately in advance. Further, the data the user can set in advance are limited to the time and minute for the time zone and the user has to operate the day setting key and the channel setting key for every reservation for the day of the week and the broadcasting channel. This invention did not largely reduce the number of operations.

SUMMARY OF THE INVENTION

It is an object of the present invention to provide a TV program recording system which enables the timer recording reservation with quite simple operation when the user makes timer reservation for the next time broadcasting of a recorded TV program in the following week or on the following day.

According to a first embodiment, a TV program recording system comprises recording/reproducing means which records the signal from the supply source selected from a plurality of signal supply sources on a recording medium and reproduces the recorded signal from the recording medium, storage means provided with a clock means which, when recording the signal, stores the recording information containing at least the time information and the signal supply source information related to the signal recording, recording means which generates the ID information to identify the recording information in the storage means and records it onto the recording medium, operation means which instructs reading of the ID information from the recording medium, reproducing means which reads the ID information from the recording medium according to such instruction, means which reads from the storage means the recording information identified by the ID information read from the recording medium, timer reservation setting means which sets the timer reservation by storing the recording information from the storage means as the timer reservation information to a reservation memory, and recording control means which controls the signal recording operation of the recording and reproducing means according to the timer reservation information set as described above.

In the first embodiment, when the next time broadcasting of the recorded TV program is broadcast in the following week or on the following day, for example, the user can record the next time broadcasting with timer reservation by pressing a particular key to read out from the recording medium the ID information when the TV program is recorded so that the recording information having the same ID as above is identified from the storage means and the information including the recorded channel, the start time and the end time is obtained and stored to the reservation memory. The system makes recording on the following day or in the following week of the program on the same channel and at the same start/end time as those of the program recorded first. Just a simple operation to press the particular key enables secure reservation of recording without a mistake. In other words, the recording information required for the next time recording is automatically stored during the recording process this time and the user does not need to set the time zone separately in advance. All the user has to do is just an action to press the particular key when repeating reservation setting for the next time broadcasting.

If the recording/reproducing means above is the recording/reproducing means of a VTR, the ID information may be included in. the control signal and recorded on the magnetic tape or may be lapped over the vertical blanking interval (VBI) of the TV video signal for recording and recorded on the recording medium.

In case of the VTR, the recording of the ID information by overlapping in the VBI of the video signal increases the amount of data to be stored when compared to the amount of data included in the control signal for recording on the control track.

The recording information stored in the storage means includes the start time and the end time when the applicable key is pressed and the recorded channel at that time when the recording is made manually with the record key, the stop key etc. When the recording is made by timer reservation, the recording information includes the start time, the end time and the channel number set in the reservation memory in advance for the timer reservation.

The ID information may be recorded i) at a position having a predetermined time from the recording start position of the recorded signal such as the video signal, ii) at a position having a predetermined time before the recording end position of the recorded signal, or iii) continuously for the whole interval of recording or repeatedly with fixed intervals concurrently with recording of the recorded signal. In case of iii), the time information indicating the elapse of recording time may be included in the ID information so that they are recorded for the whole interval of recording.

When the resetting process for reservation of the next time broadcasting is started by pressing of the particular key, the system searches the recording medium for the ID information and, in case of i) above, stops the recording medium at the ID reading position so that the timer recording reservation is set at that position and enters the timer recording standby status. This enables overwriting of the previously recorded signal. In case of ii) above, the system reads out the ID information, stops the recording medium at the position where reading ends. With setting the timer recording reservation for the next time at that position, the system enters the timer recording standby status. This enables serial recording following the previously recorded signal. In case of iii) above, the system reads out the ID information and, with referring to its recording time elapse information, determines the stop position according to the user's operation. The timer recording reservation is set at that position and the system enters the timer recording standby status. Thus, when the timer recording is started next time, the recording is started from the applicable stop position corresponding to the recording position of i) to iii) above.

According to a second embodiment, a TV program recording system comprises recording/reproducing means which stores the program information consisting of the time information containing at least the start time of broadcasting as well as the channel number for a TV program to be broadcast in the future to a reservation information storage means in advance and, according to the program information, records the program to the recording medium and reproduces it, ID information recording means which generates the ID information for program identification in the program recording and stores such information to the recording medium, program information storage means which stores the program information for the program corresponding to such ID information with associating the ID information, ID information reproduction means which reproduces the ID information from the recording medium, and reservation setting means which reads the program information corresponding to the reproduced ID information and stores it to the reservation information storage means.

DETAILED DESCRIPTION OF THE PREFERRED EMBODIMENTS

Referring to the accompanying drawings, preferred embodiments of the present invention will be described below.

Figure 1:
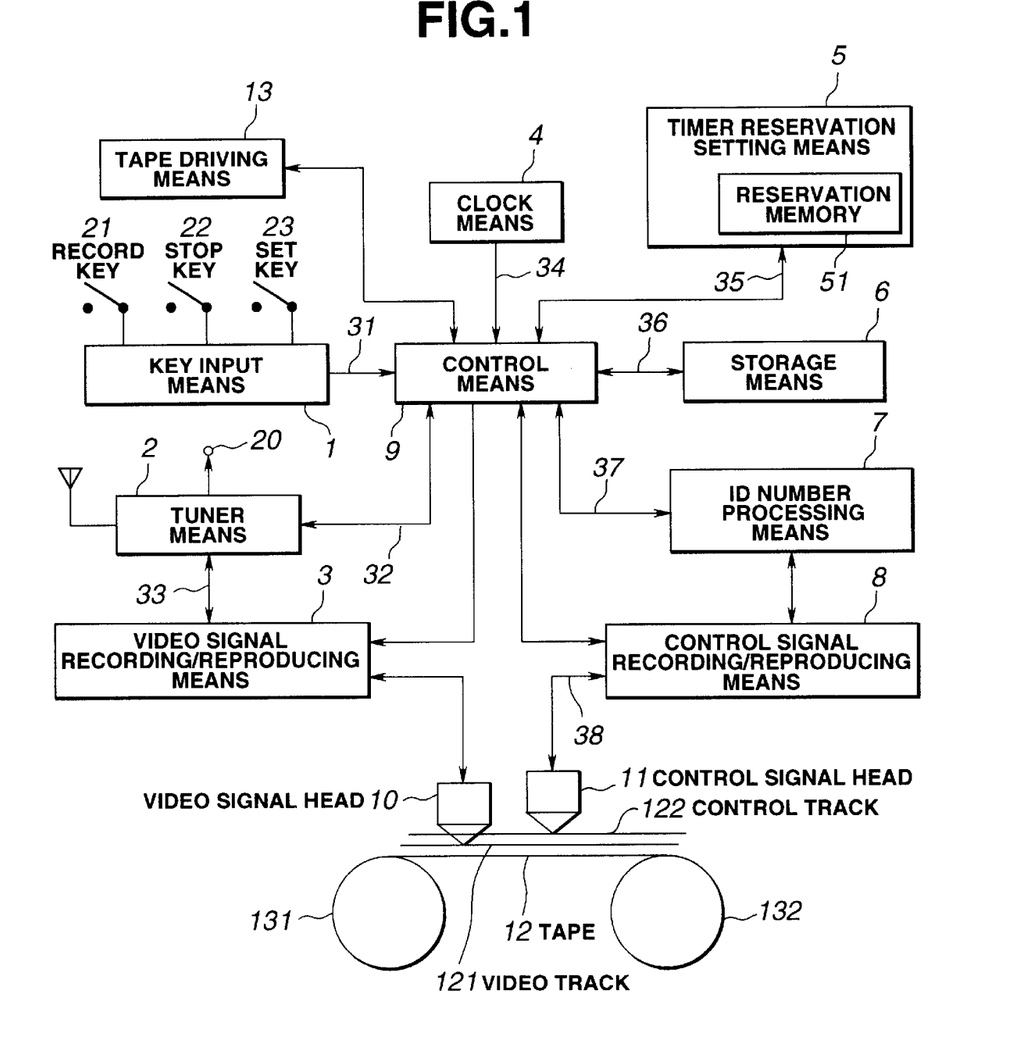
FIG. 1 is a block diagram showing an embodiment of a TV program recording system according to the present invention.

FIG. 1 is a block diagram showing an embodiment of a TV program recording system according to the present invention. In this embodiment, the present invention is applied to a VTR provided with the timer reservation recording function.

In FIG. 1, the TV program recording system according to this embodiment comprises a key input means 1 as an operation means, a tuner means 2 with a plurality of signal supply sources (channels), a video signal recording/reproducing means 3 as a recording and reproduction means, a clock means 4, a timer reservation setting means 5, a storage means 6, an ID number processing means 7, a control signal recording/reproducing means 8, a control means 9 consisting of microcomputer and other components, a video signal head 10, a control signal head 11, a magnetic tape 12 as a recording medium and a tape driving means 13.

The key input means 1 is further provided with various keys including a record key 11 to start the recording, a stop key 12 to stop the tape during recording or reproducing, a ten-key pad or up/down keys (not shown) to set the recorded channel, and a set key 23 to set the timer recording reservation characterizing the present invention. Corresponding to the operation of the keys, the key input data are supplied to the control means 9. When the set key 23 is pressed, the control means 9 reads the ID number already recorded on the tape 12 and reads recording information 36 corresponding to the ID No. from the storage means 6 and sets such information to the timer reservation setting means 5.

The tuner means 2 receives the TV broadcasting signal corresponding to the desired channel No. input from the ten-key pad or up/down keys of the key input means 1, detects the signal and reproduces the video signal and audio signal of the base band. The tuner means 2 is provided with an output terminal 20 to supply the video signal and the audio signal to a display unit (not shown).

The video signal recording/reproducing means 3 has, during recording, the video signal from the tuner means 2 input and converts such signal into the recording signal to be recorded on the magnetic tape 12, outputs it to the video signal head 10. At the same time, it outputs the audio signal to a sound head (not shown). During reproduction, it restores the recording signal from a video track 121 on the magnetic tape 12, which is detected by the video signal head 10, to the base band video signal. It outputs such signal to the tuner means 3 together with the audio signal reproduced at the sound head.

The clock means 4 generates the time data and supplies it to the control means 9 and to a monitor means such as a liquid crystal device (not shown).

The timer reservation setting means 5 is provided with a plurality of reservation memories 51 as the reservation information storage means. Several sets of recording reservation information (including the recorded channel, the start time and the end time) input to the reservation memories 51 by the operation on the key input means 1 and the recording information read out from the storage means 6, which characterizes the present invention, are stored as the timer reservation data.

The storage means 6 stores, during recording of the television signal to the magnetic tape 12, the recording information (program information) containing the time information including at least the start time and the end time of recording or the start time and the time elapse of recording as well as the source information indicating the supply source (channel) of the recorded signal.

The ID number processing means 7 generates the ID information to specify the recording information stored in the storage means 6.

During recording, the control signal recording/reproducing means 8 generates the control signal corresponding to the vertical sync signal contained in the video signal, includes the ID information generated by the ID number processing means 7 into the above control signal and supplies them together to the control signal head 11 so that they are recorded on the control track of the magnetic tape 12. During reproduction, it reproduces the control signal and the ID information from the signal detected from the control track of the magnetic tape 12 and supplies them to the servo circuit (not shown) and the ID number processing means 7 respectively.

According to the key input data from the key input means 1 and the time data from the clock means 4, the control means 9 controls the tuner means 2, the video signal recording/reproducing means 3, the timer reservation setting means 5, the storage means 6, the ID number processing means 7 and the control signal recording/reproducing means 8 and thereby executes the conventional timer reservation and recording, as well as makes the control operation to set a new timer reservation for recording execution using the storage means 6 and the ID information record as described later, which characterizes the present invention.

The tape driving means 13 comprises reels 131 and 132 on the feeding side and on the winding side around which the magnetic tape 12 is wound, as well as capstans, pinch rollers, capstan motors and reel driving motors (not shown) to move the magnetic tape 12. It drives the magnetic tape 12 corresponding to the operation mode.

Figure 2:
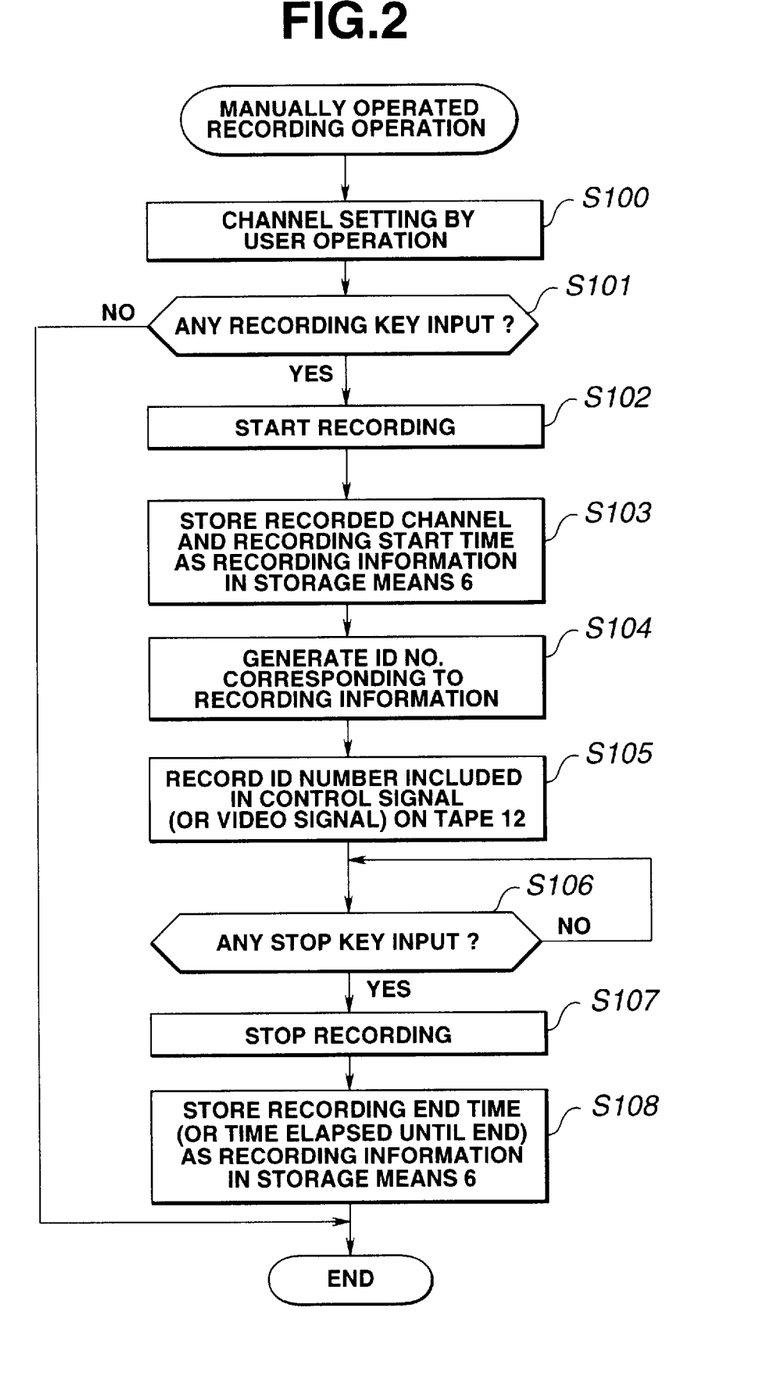
FIG. 2 is a flowchart illustrating the manually operated recording operation in the embodiment of FIG. 1.
Figure 3:
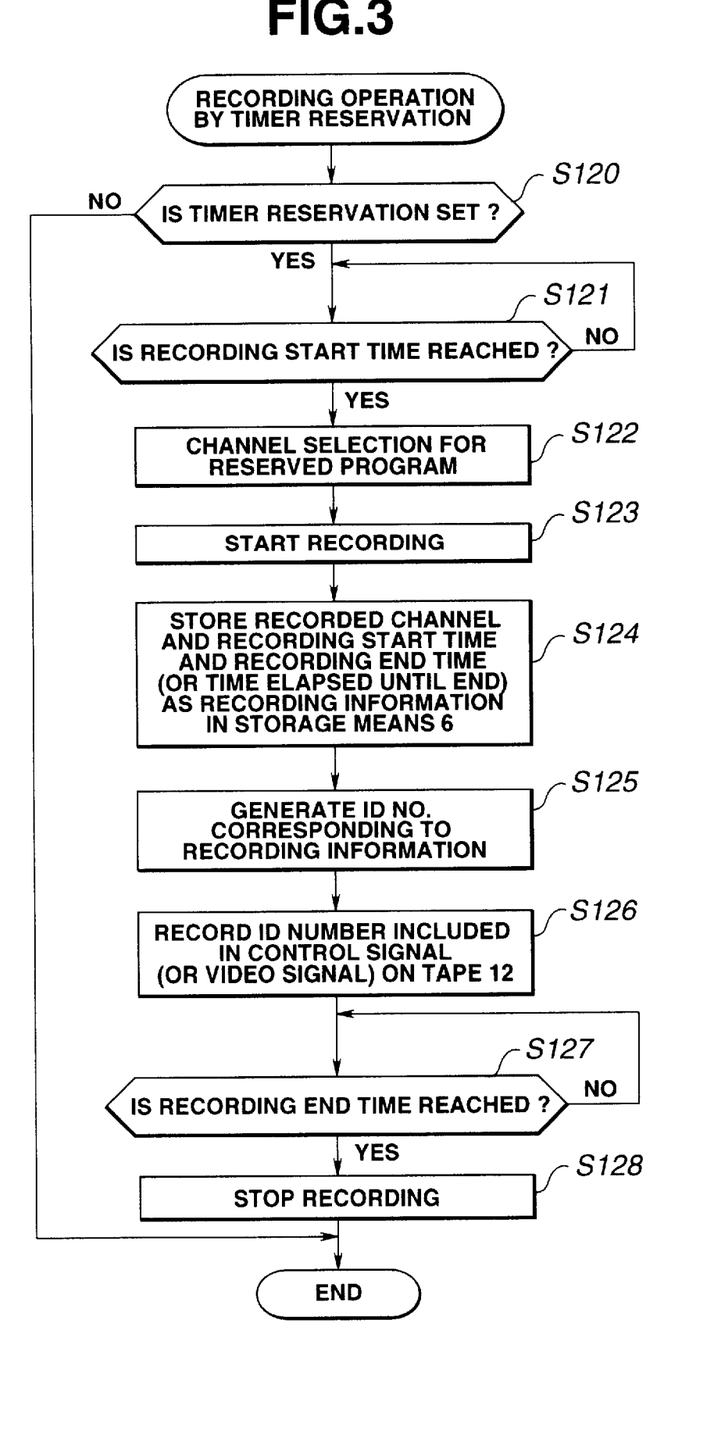
FIG. 3 is a flowchart illustrating the recording operation by timer reservation in the embodiment of FIG. 1.
Figure 4:
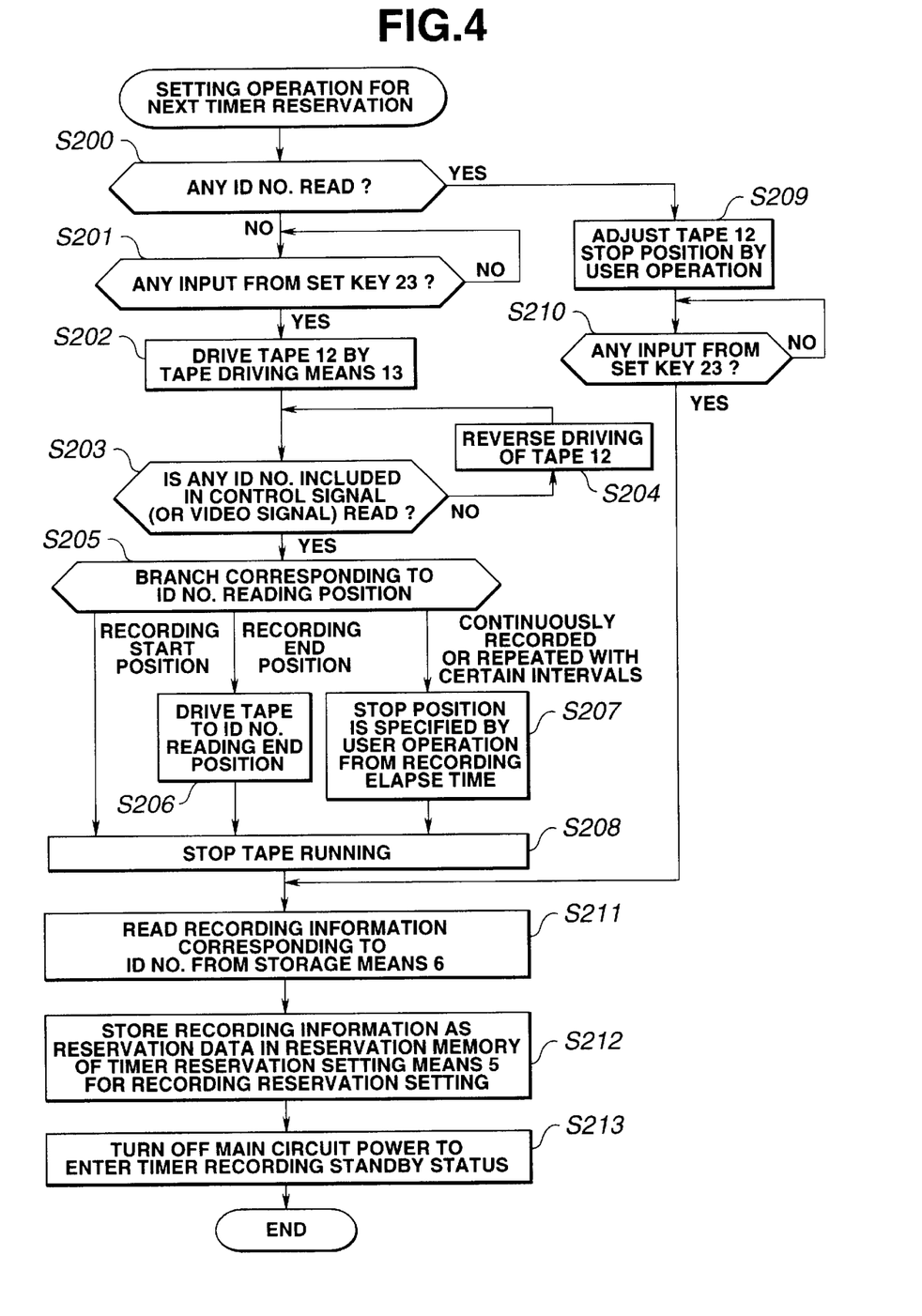
FIG. 4 is a flowchart illustrating the resetting operation for reservation of the next time broadcasting in the embodiment of FIG. 1.

Next, referring to the flowcharts of FIGS. 2 to 4, the operation of the TV program recording system of FIG. 1 is described.

FIG. 2 is a flowchart illustrating the recording process of the control means made by manual operation.

At the step S100, the control means controls the tuner means 2 corresponding to the user's key operation to set and select the recorded channel. Then, when the user operates the record key 21 at S101, it controls the tape driving means 13 and other devices to start recording at S102. After the start of recording, it stores the recorded channel and the recording start time to the storage means 6 as the recording information at S103.

In case the recording is made manually by pressing of the record key 21, the control means 9 automatically stores, to the storage means 6, the recording information 36 including the time when the recording is started and the time when it is ended (or the starting time and the lapse of time from the start to the end) according to time data 34 from the clock means 4 as well as channel data 32 corresponding to the recorded channel for recording of a TV program.

The start time and the end time stored in the storage means 6 are, in case of manual recording, the time when the record key 21 is pressed and the time when (or the time elapsed until) the stop key 12 is pressed. When the control means 9 stores the start time and the end time to the storage means 6, it can round up or round off the time data from the clock means 4 by the unit of five or fifteen minutes, add or subtract a minute or otherwise process the time data before storage.

When a TV program is recorded, as shown at S104, the control means 9 generates an ID number 37 corresponding to the recording information 36 to be stored to the storage means 6 and sends it to the ID number processing means 7. Then, as shown at S105, the ID number processing means 7 supplies the ID number 37 to the control signal recording/reproducing means 8 and the control signal recording/reproducing means 8 modulates the duty of the control signal corresponding to the ID number 37 to include the ID number 37 into the control signal and automatically records the modulated control signal onto the tape 12 by the control signal head 11. The ID number generated by the control means 9 at the step S104 above has "1 " for the initial value and is incremented by one every time a new recording process is started. In the storage means 6, the storage area (address) of the recording information 36 for a program is in one-to-one correspondence with the ID number 37.

At S106, it is judged whether the stop key 22 is manually operated or not. Upon input from the stop key, the recording is stopped at S107. At the same time, at S108, the recording end time (or the time elapsed until the end) is stored to the storage means 6 as the recording information.

FIG. 3 shows a flowchart illustrating the recording process of the control means with timer reservation.

At the step S120, it is judged whether the user has set the timer reservation with specifying the recorded channel and the start/end time. If the timer reservation is set, it is judged whether the recording start time is reached or not at S121. If the start time is reached, the tuner means 2 is controlled so that the channel of the reserved program is selected at S122 and then the tape driving means 13 is controlled at S123 for start of recording. After the start of recording, the recorded channel and the recording start time and the recording end time (or the time elapsed until the end) are stored to the storage means 6 as the recording information at S124.

When recording is made with the timer reservation, the timer reservation information (including the recorded channel and the start/end time) is in advance stored to a reservation memory 51 of the timer reservation setting means 5. The start time and the end time (or the time elapsed until the end) of recording may be stored to the storage means 6 according to such timer reservation information read out from the reservation memory 51 at the step S124 after the start of recording.

Next, the control means 9 generates an ID number 37 corresponding to the recording information 36 to be stored to the storage means 6 and sends it to the ID number processing means 7 as shown in S125. Then, as shown in S126, the ID number processing means 7 supplies the ID number 37 to the control signal recording/reproducing means 8 and the control signal recording/reproducing means 8 modulates the duty of the control signal corresponding to the ID number 37 to include the ID number 37 into the control signal and automatically records the modulated control signal onto the tape 12 by the control signal head 11. The ID number generated by the control means 9 at the step S125 above has "1 " for the initial value and is incremented by one every time a new recording process is started. In the storage means 6, the storage area (address) of the recording information 36 for a program is in one-to-one correspondence with the ID number 37.

After that, it is judged at S127 whether the recording end time is reached. If the recording end time is reached, the recording is stopped at S128.

FIG. 4 shows a flowchart illustrating the resetting process for reservation of the next time broadcasting.

With the tape 12 having a record of the TV program and the ID number as described above set into the VTR, the control means 9 judges at first whether any ID number is read as shown in S200. If not, it judges whether any input has been received from the set key 23 at S201. If the set key 23 has been pressed, as shown in S202, the tape driving means 13 reverses or forwards the tape 12 to feed the tape 12 until the control signal head 11 reads the ID number contained in the control signal 38 from the control track 122 at S203 and S204. The control means 9 reads out the ID number using the ID number processing means 7 by decoding the control signal read by the control signal recording/reproducing means 8. The step S204 shows that, if any ID number cannot be read even after feeding of the tape 12 for a certain time, the tape 12 can be fed in the reverse direction until the ID number is read. This further secures the ID number retrieval.

When the ID number is read, the control means 9 makes branching at S205 corresponding to the recording position or the reading position of the ID number on the control track of the tape 12.

At the step S105 of FIG. 2 or the step S126 of FIG. 3, the ID number recorded on the control track of the tape 12 may be i) at a position near the recording start position, ii) at a position near the recording end position, or iii) continued during recording or repeated with fixed intervals during recording. In case of ii), the ID number is actually recorded at a position having a predetermined time a little before the recording end position. In case of iii), the time information indicating the lapse of recording time is added to the ID number and they are continuously recorded for the whole interval of recording or recorded repeatedly with fixed intervals.

Thus, in FIG. 4, when the ID number is read at a position near the recording start position (i)), the tape driving means 13 is controlled at the position where the ID No. is read so that the tape is stopped as shown in S208. When it is read at a position near the recording end position (ii)), it is detected a little before the end position and, as shown in S206, the tape running is continued to the position where the ID number reading ends. Then, at the reading end position, the tape driving means 13 is controlled so that the tape is stopped. When the ID number is continuously read or repeatedly read with fixed intervals (iii)), the recording time elapsed is displayed on the display means (not shown) so that, as shown in S207, the user checks the recording time elapsed and the tape is stopped at the stop position determined by the user's operation of the stop key 22.

After the tape stops at S208, the control means 9 reads out, at S211, the recording information 36 in one-to-one correspondence with the read ID number from the storage means 6.

Note that the control means 9 reads the ID number from the control signal even before pressing of the setting key 23 at S201 when the section having the ID number on the control track 122 passes the control signal head 11 in case the tape 12 on which a TV program has been already recorded is reproduced.

Therefore, when it is found that the ID number has been already read at S200, the tape 12 is moved according to the user operation as shown in S209. The user adjusts the tape stop position as required for recording of the next time broadcasting by operating the stop key 22 with viewing the screen displayed on the display unit (not shown). When the set key 23 is pressed after that as shown at S210, the recording information 36 in one-to-one correspondence with the ID number already read is read from the storage means 6 as shown at S211. The processes S200, S209, S210 and S211 to S213 represent the procedure when the user reproduces an already recorded program and then sets the timer reservation for the next time broadcasting of the same program.

If the set key is pressed immediately after insertion of a tape cassette with a TV program and its ID number recorded (without verifying the program contents by displaying it on the screen), the control means 9 controls the tape driving means 13, searches for and reads the ID. It displays the timer reservation information corresponding to that ID on the display means to confirm the user's intention for reservation.

The control means 9 reads out the recording information 36 from the storage means 6 at S211 and obtains the recording start time and the recording end time (or the recording time elapsed) as well as the channel data of the program recorded on the tape 12 and sends them as the reservation data to the timer reservation setting means 5.

At S212, the timer reservation setting means 5 stores the reservation data having the same time (or time elapsed) and channel as the start time, the end time (or the recording time elapsed) and the channel sent to it to the reservation memory 51 of the timer reservation setting means 5 and thereby sets the timer recording reservation for that day, for the following day or for the following week. The control means 9 may round up or round off the time set to the reservation memory 51 by the unit of five or fifteen minutes or otherwise process data.

After the timer reservation setting, as shown in S213, the system automatically goes to the standby status with turning off the main circuit power of the VTR for the timer reservation setting contents obtained as described above. Alternatively, the reservation contents may be displayed on the display unit (not shown) for the user's confirmation, and the system goes to the timer recording standby status when the user presses the timer key or the like.

As described above, the ID number recorded on the control track 122 of the tape 12 may be i) at a position near the recording start position, ii) at a position a little before the recording end position, or iii) continued or repeated with fixed intervals for the whole interval of recording together with the recording lapse time information.

Therefore, there are three ways to start recording according to the reservation after searching for the ID number by reversing or forwarding the tape 12 having a recorded program and reading the ID number to set the timer reservation recording of the next time broadcasting as in the reservation resetting process of FIG. 4.

i) When the ID number is recorded near the start position, the recording start position can be determined from the position where the ID number is detected. This easily enables the timer recording of the next time program from the same position to overwrite the tape with the new recording.

ii) When the ID number is recorded near the end position, the recording end position can be determined from the position where the ID number is detected. This easily enables the timer recording of the next time program from the same position to record the next time broadcasting serially after the previous one.

iii) When the ID number is continued or repeated with fixed intervals during recording, the ID number can be easily retrieved at any tape position of the recorded program, and the timer recording can be started from such retrieval position. In practice, when the recording lapse time information is included in the ID number information, it is easy to determine the recording start position from such recording lapse time information.

In the embodiment as describe above, the ID number is recorded onto the control track 122. However, the ID number may be lapped over the vertical blanking interval (VBI) of the recorded video signal. In this case, the ID number is recorded onto the video track 121 with the video signal.

By thus lapping the ID number over the VBI of the video signal for recording, the data amount to be recorded on VBI can be several times to several tens of times the amount recorded on the control track. It easily becomes possible to record data other than the ID number.

For example. the elapse of time from the start of recording can be continuously recorded on the VBI in addition to the ID number. By sequentially recording the time lapse data with the video signal, the system can read the time elapsed in recording when reproducing a recorded program. It can retrieve the recording start position and quickly move the tape 12 to that start position by forward or reverse feeding. Thus, the system can stop the tape, start reproducing or recording or start timer recording at such start position. By the way, the time lapse data may be also recorded on the control track 122.

As described above, according to this embodiment of the present invention, the user can set the timer recording reservation by one simple action just to press the set key 23 when the user records a TV program on the air every week or every day and, after reproducing or viewing such program on the tape 12, desires to record the next time broadcasting of the same program. In particular, this system is effective when the user wants to record such program without setting the reservation for every day or every week and when the user just wants to record the next time broadcasting only.

By fixing the program for every video cassette, the user can easily make a library. Even a user who does not usually use the timer reservation function can set the reservation for the next time broadcasting just by setting the tape cassette and can make the recording reservation without mistake.

Though the above embodiment describes a TV program recording system applied to a VTR, it is understood that the present invention is also applicable to other writable and readable recording/reproducing devices such as digital video disk devices in addition to VTR.

The present invention is not limited to the embodiment described above. Obviously various modifications can be made to the above embodiment without departing from the scope and spirit of the invention.

What is claimed is:

1. A television program recording system, comprising:

setting means operative to set a desired source from a plurality of signal supply sources;

channel selection means for selecting and receiving the signal of the desired supply source set by the setting means;

recording/reproducing means which records the signal from a supply source selected from a plurality of signal supply sources to a recording medium and reproducing the recorded signal from the recording medium;

clock means for generating time information;

storage means for storing a recording information containing time information from the clock means and the supply source information from the setting means when operated to record the signal of the desired supply source;

recording means for generating an ID information to identify the recording information in the storage means and recording the ID information onto the recording medium;

operation means for instructing reading of the ID information from the recording medium;

reproducing means for reading the ID information from the recording medium according to such instruction;

means for reading from the storage means the recording information identified by the ID information read from the recording medium;

timer reservation setting means for setting the timer reservation by storing the recording information from the storage means as the timer reservation information to a reservation memory; and recording control means for controlling the signal recording operation of the recording/reproducing means according to the timer reservation information set as described above.

2. A television program recording system according to claim 1, wherein the recording/reproducing means is that of a video tape recorder and the ID information is included into a control signal and recorded onto a magnetic tape.

3. A television program recording system according to claim 1, wherein the recording signal is a television video signal and the ID information is lapped over a vertical blanking interval of the video signal and recorded on the recording medium.

4. A television program recording system according to claim 1, wherein the ID information is recorded at a position having a predetermined time from a recording start position of the signal.

5. A television program recording system according to claim 1, wherein the ID information is recorded at a position having a predetermined time before a recording end position of the signal.

6. A television program recording system according to claim 1, wherein the ID information is recorded continuously for the whole interval of recording concurrently with recording of the signal.

7. A television program recording system according to claim 1, wherein the ID information is recorded continually with fixed intervals for the whole interval of recording concurrently with recording of the signal.

8. A television program recording system, comprising:

reservation information storage means for storing timer reservation information having time information including at least a record start time and a channel number by operation of a user;

recording/reproducing means for recording/reproducing a program to/from a recording medium according to the timer reservation information of the reservation information storage means;

ID information recording means for generating an ID information for program identification in the program recording and storing such information to the recording medium;

program information storage means for storing program information for the program corresponding to such ID information with associating the ID information;

ID information reproduction means for reproducing the ID information from the recording medium; and reservation setting means for reading the program information corresponding to the reproduced ID information and storing the program information to the reservation information storage means.

9. A television program recording system according to claim 8, further comprising:
   operation means to instruct reading of the ID information from the recording medium.

10. A television program recording system according to claim 8, wherein recording/reproducing means is that of a video tape recorder and the ID information is included into a control signal and recorded onto a magnetic tape.

11. A television program recording system according to claim 8, wherein the ID information is lapped over a vertical blanking interval of the television signal and recorded on the recording medium.

12. A television program recording system according to claim 8, wherein the ID information is recorded at a position having a predetermined time from a recording start position of the television signal of the program.

13. A television program recording system according to claim 8, wherein the ID information is recorded at a position having a predetermined time before a recording end position of the television signal of the program.

14. A television program recording system according to claim 8, wherein the ID information is recorded continuously for the whole interval of recording concurrently with recording of the television signal of the program.

15. A television program recording system according to claim 8, wherein the ID information is recorded continually with fixed intervals for the whole interval of recording concurrently with recording of the television signal of the program.

16. A television program recording method of recording the signal from a supply source selected from a plurality of signal supply sources to a recording medium and reproducing the recorded signal from the recording medium, comprising:
   storing the recorded channel and the start time as the recording information in storage means when recording to the recording medium is started by the operation of a record key while a desired channel is being received by channel selection means;
   producing ID information corresponding to the recording information and recording the ID information to the recording medium;
   storing the end time as the recording information in the storage means when recording is stopped by the operation of a stop key after the recording;
   reading the ID information while driving the recording medium, in which the television program and the ID information are recorded, by recording medium drive means based on an instruction from operation means;
   stopping driving of the recording medium in correspondence with the reading position;
   reading the recording information corresponding to the ID information from the storage means; and
   setting a record reservation by storing the recording information in a reservation memory of a timer reservation setting means.

17. A television program recording method of recording the signal from a supply source reserved from a plurality of signal supply sources to a recording medium and reproducing the recorded signal from the recording medium, comprising:
   receiving the reserved record channel by channel selection means at a record start time while the record channel, the record start time and the record end time are reserved;
   recording the record channel, the record start time and the record end time as the recording information in storage means when recording of the received signal to the recording medium is started;
   producing ID information corresponding to the recording information and recording the ID information to the recording medium;
   stopping recording at the record end time;
   reading the ID information while driving the recording medium in which the television program and the ID information are recorded, by recording medium drive means based an instruction from operation means;
   stopping the driving of the recording medium in correspondence with the reading position;
   reading the recording information corresponding to the ID information from the storage means; and
   setting a record reservation by storing the recording information in a reservation memory of a timer reservation setting means.

* * * * *